(12) United States Patent
Judas et al.

(10) Patent No.: US 11,583,938 B2
(45) Date of Patent: Feb. 21, 2023

(54) MACHINE TOOL HAVING A MOVABLE TOOL CARRIER, TOOL CARRIER AND TOOL HOLDER THEREFOR

(71) Applicant: ESA Eppinger GmbH, Denkendorf (DE)

(72) Inventors: Joel Judas, Unterensingen (DE); Rolf Liedecke, Stuttgart (DE)

(73) Assignee: ESA Eppinger GmbH, Denkendorf (DE)

( * ) Notice: Subject to any disclaimer, the term of this patent is extended or adjusted under 35 U.S.C. 154(b) by 194 days.

(21) Appl. No.: 16/942,510

(22) Filed: Jul. 29, 2020

(65) Prior Publication Data
US 2021/0031274 A1    Feb. 4, 2021

(30) Foreign Application Priority Data

Jul. 30, 2019  (DE) ...................... 10 2019 120 522.0
May 20, 2020 (EP) ..................................... 20175642

(51) Int. Cl.
  *B23B 29/24* (2006.01)
  *B23B 31/26* (2006.01)
  *B23Q 1/00* (2006.01)

(52) U.S. Cl.
  CPC .......... *B23B 29/242* (2013.01); *B23B 31/261* (2013.01); *B23Q 1/0063* (2013.01)

(58) Field of Classification Search
  CPC ..... B23B 29/20; B23B 29/246; B23B 29/242; B23B 29/34; B23B 2270/08;
  (Continued)

(56) References Cited

U.S. PATENT DOCUMENTS 3,867,756 A * 2/1975 Koch ................. B23Q 3/15513
                                                                     483/68
5,873,682 A    2/1999 Tripsa
(Continued)

FOREIGN PATENT DOCUMENTS

DE      2907995 A1    11/1979
DE   19940330 A1     3/2001
(Continued)

OTHER PUBLICATIONS

Extend European Search Report dated Dec. 7, 2020, in corresponding European Application No. 20175642.6, with machine English translation (23 pages).
(Continued)

*Primary Examiner* — Boyer D Ashley
*Assistant Examiner* — Reinaldo A Vargas Del Rio
(74) *Attorney, Agent, or Firm* — Fitch, Even, Tabin & Flannery LLP

(57) ABSTRACT

A machine tool comprises a tool carrier, e.g. in the form of a turret disc (7) that is provided with receptacles (8) for tool holders (9), wherein each tool holder and tool carrier comprise support surfaces associated to each other and devices for fixing the tool holder at the tool carrier. At least one clamping element is provided at the tool carrier (7) that is adjustably supported between a clamping position and a release position in a direction transverse to a tie rod of a tool holder arranged on a slider (22) receptacle of the tool carrier. The clamping element is provided with a first clamping surface (24) that can be brought into engagement with a second clamping surface (35) at the tie rod of the tool holder in a self-locking and releasable manner.

11 Claims, 7 Drawing Sheets

(58) Field of Classification Search
CPC ............ B23B 2270/09; Y10T 29/5165; Y10T 29/5166; Y10T 29/5167; Y10T 483/1719; Y10T 483/1721; B23Q 2003/15586
See application file for complete search history.

(56) References Cited

U.S. PATENT DOCUMENTS

| | | | |
|---|---|---|---|
| 10,173,267 B2 * | 1/2019 | Judas | .................... B23B 29/248 |
| 2020/0215621 A1 * | 7/2020 | Judas | ................. B23Q 3/15513 |
| 2020/0269368 A1 | 8/2020 | Schumacher | |
| 2021/0016366 A1 * | 1/2021 | Daunert Armillas | ... B23B 31/06 |

FOREIGN PATENT DOCUMENTS

| | | | | |
|---|---|---|---|---|
| DE | 102008048206 A1 | | 4/2010 | |
| DE | 102014102082 A1 | | 8/2015 | |
| DE | 102014119482 A1 | | 6/2016 | |
| DE | 102017007905 A1 | * | 2/2019 | |
| DE | 102017007905 A1 | | 2/2019 | |
| EP | 2910325 A1 | * | 8/2015 | ............. B23B 29/20 |
| EP | 2910325 A1 | | 8/2015 | |
| EP | 3698906 A1 | | 8/2020 | |

OTHER PUBLICATIONS

German Office Action dated Jul. 24, 2020, in corresponding German Application No. 10 2019 120 522.0, with machine English translation (23 pages).

* cited by examiner

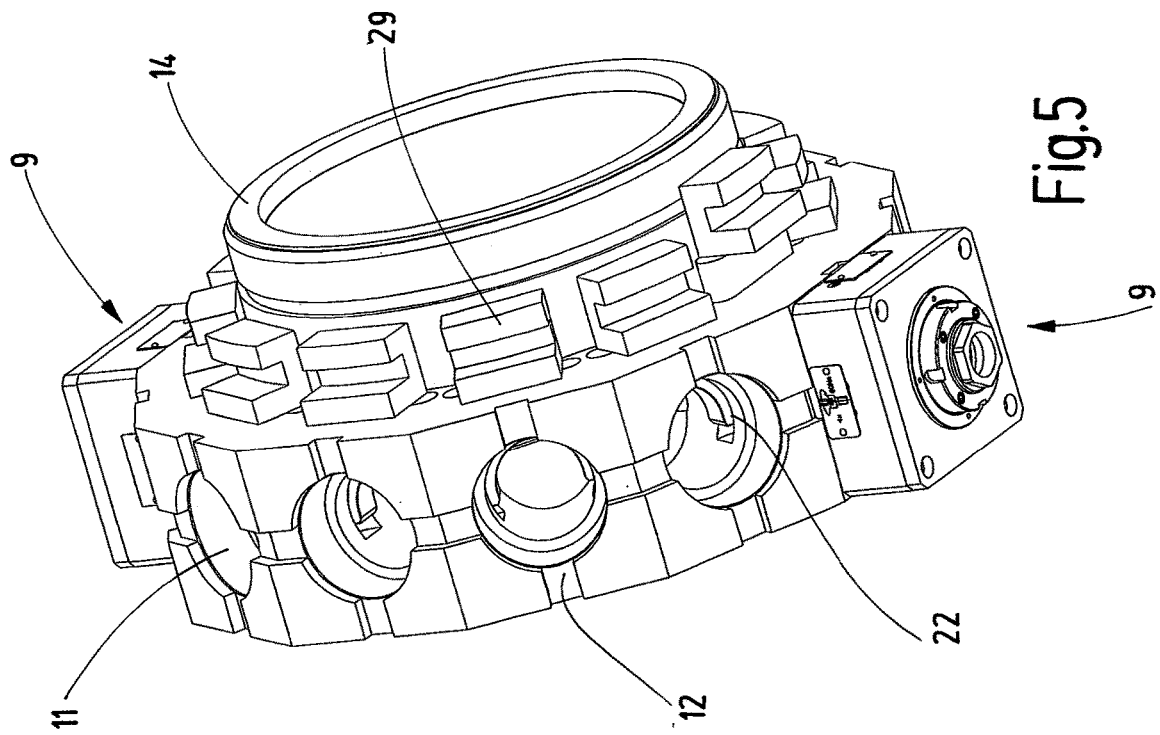
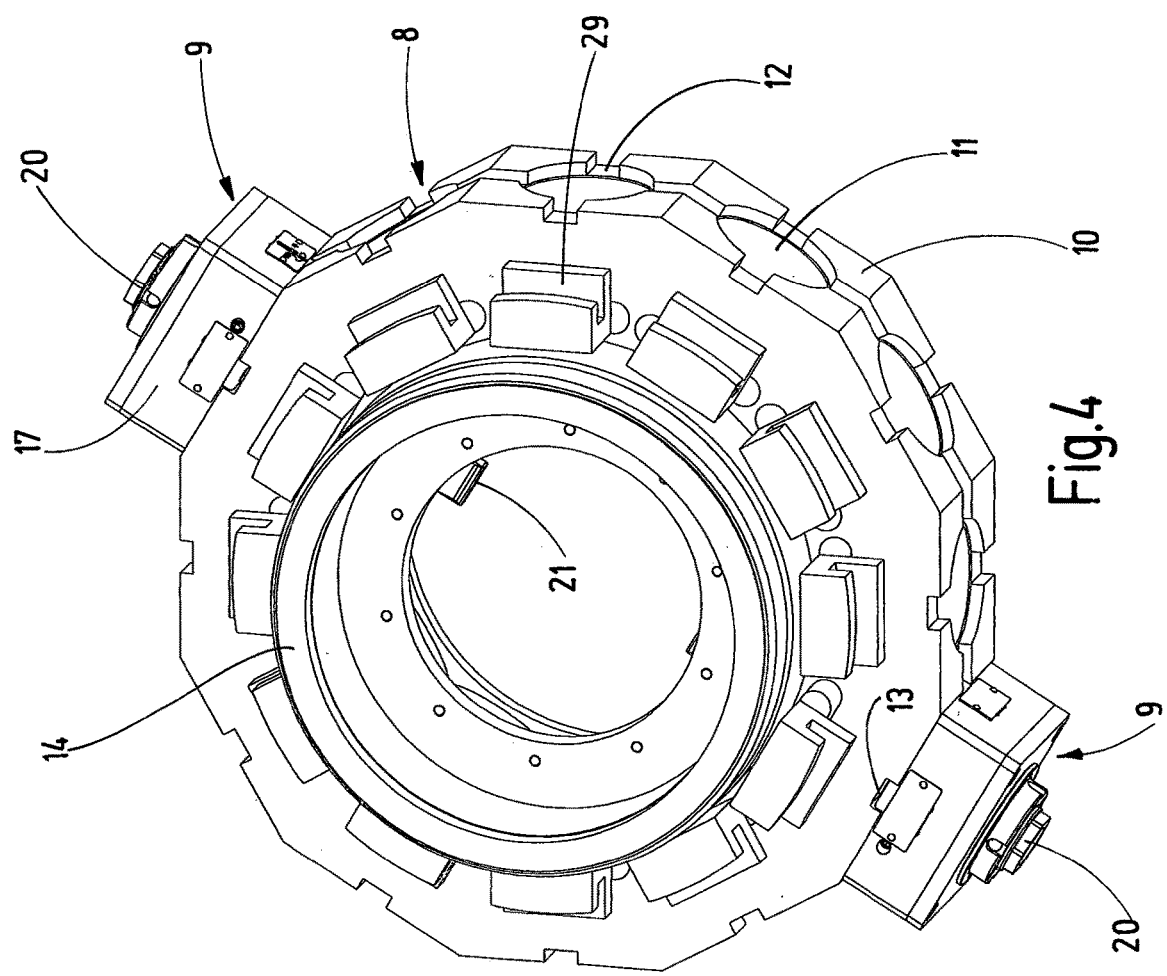

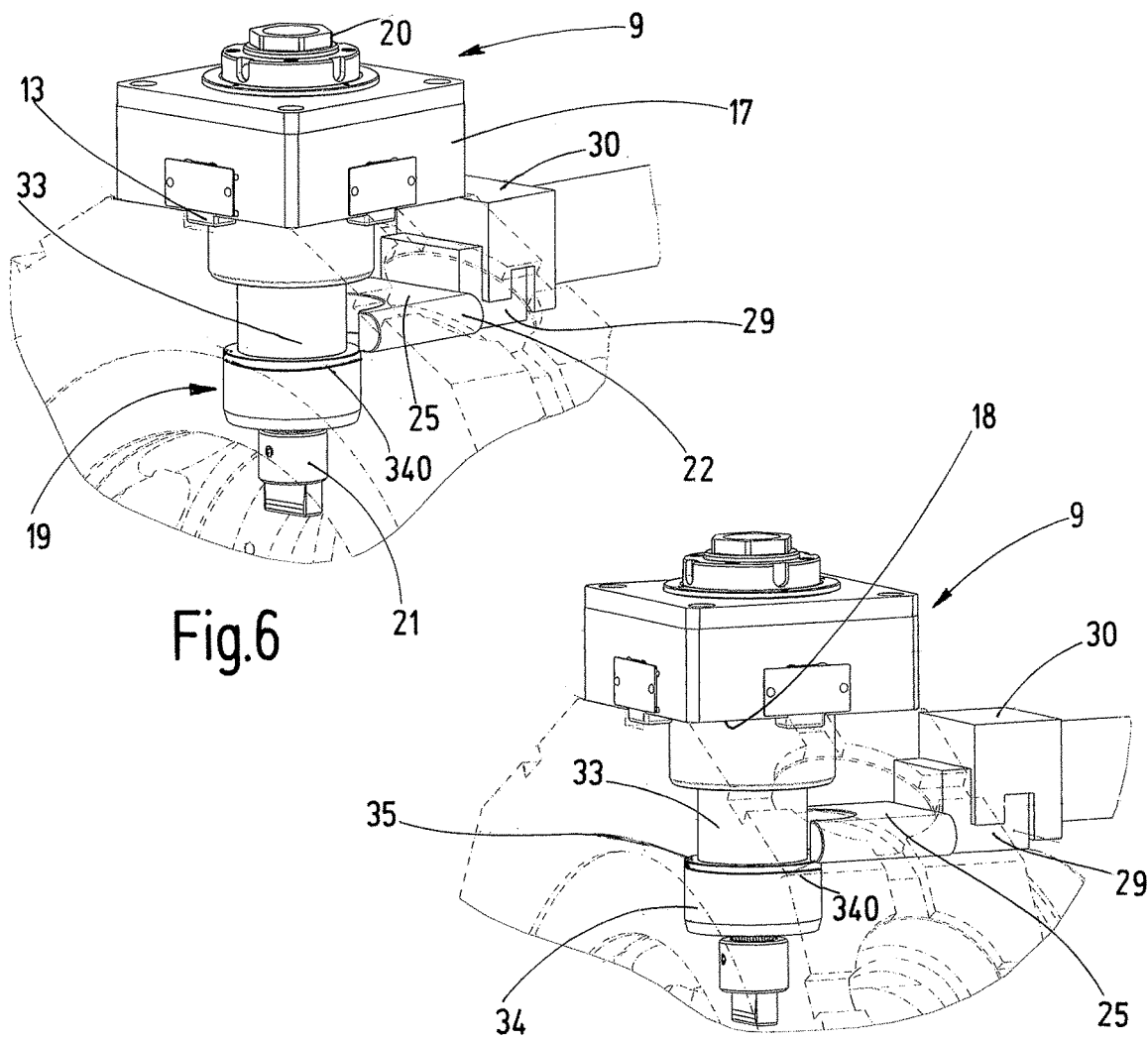
Fig.6
Fig.7
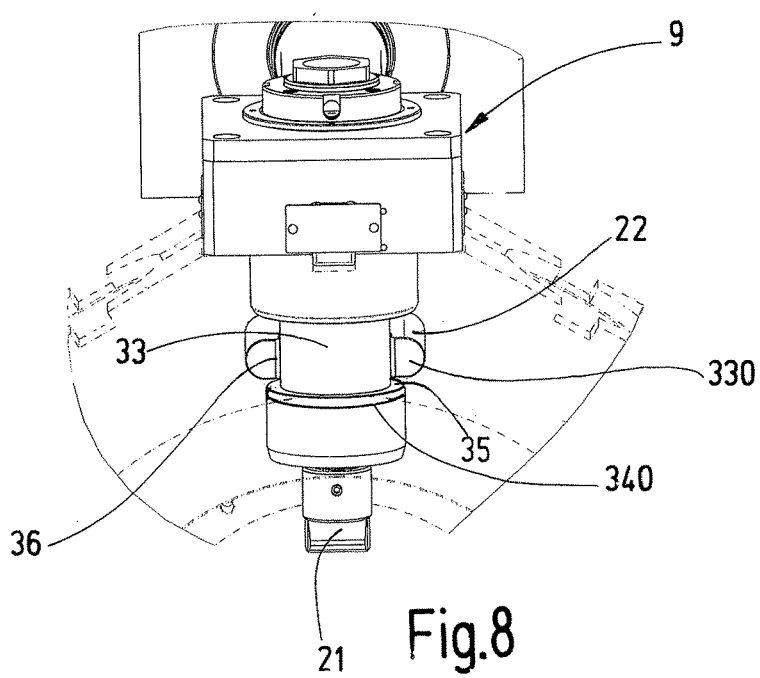
Fig.8

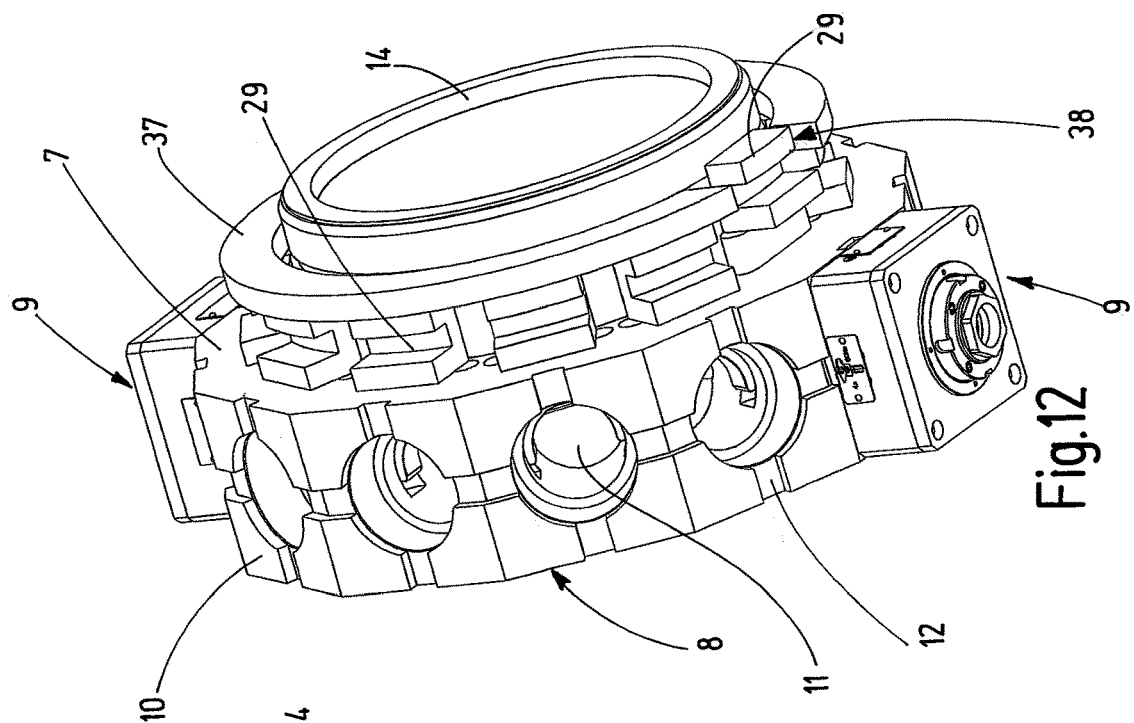
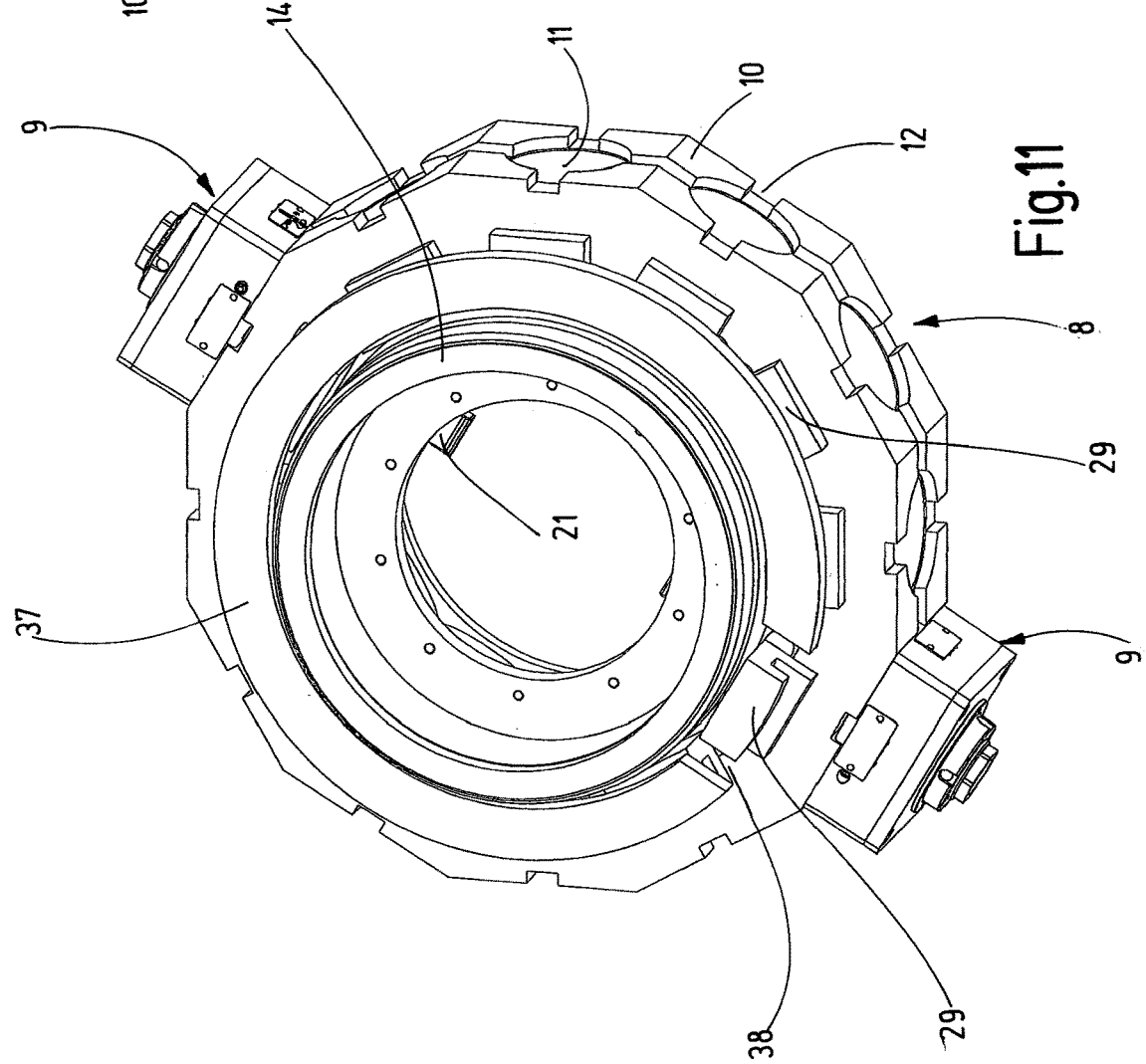

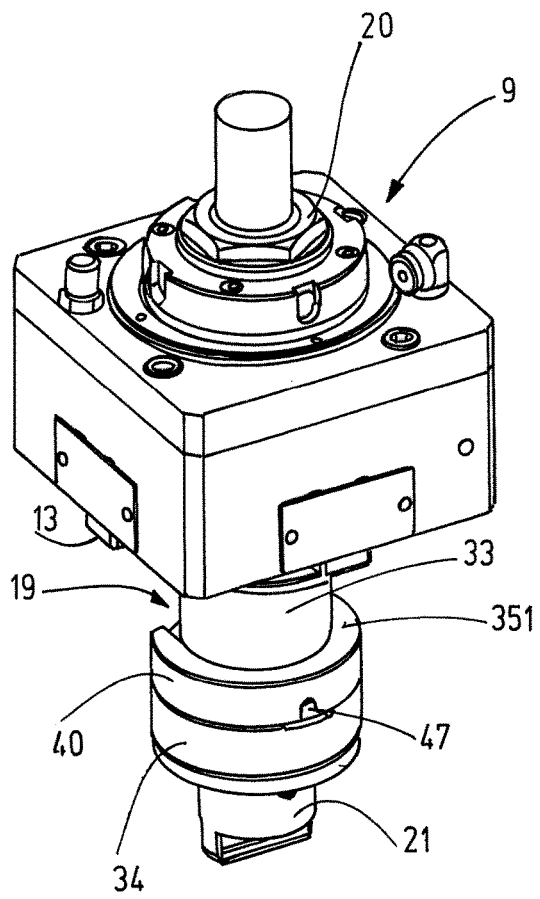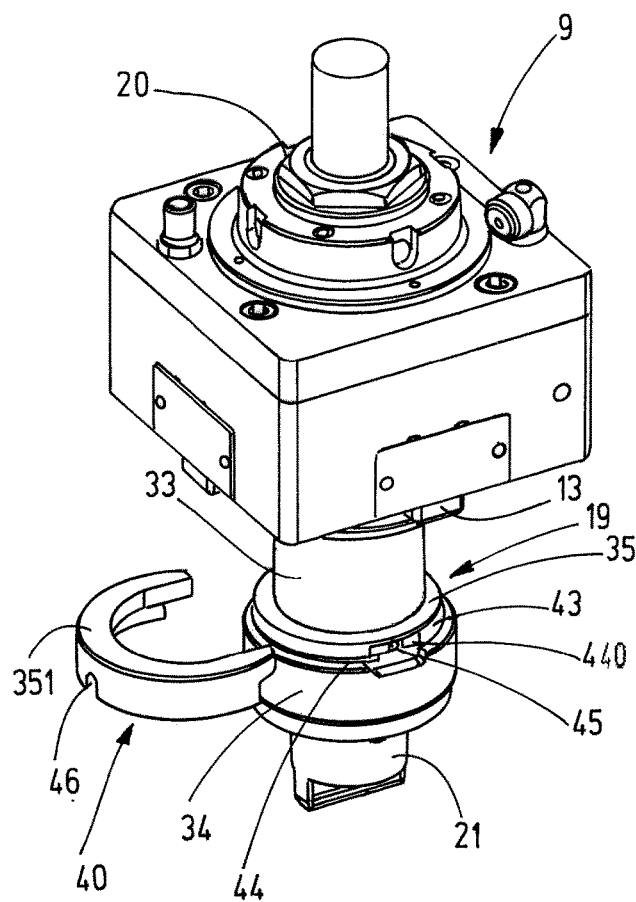
Fig.13  Fig.14
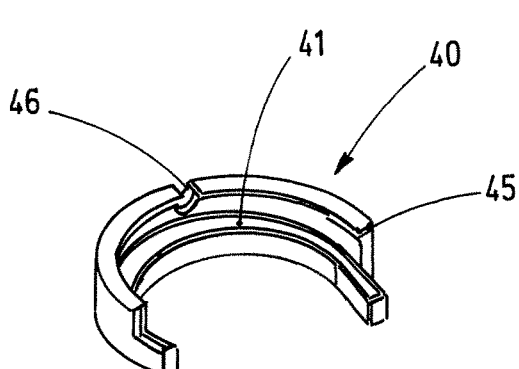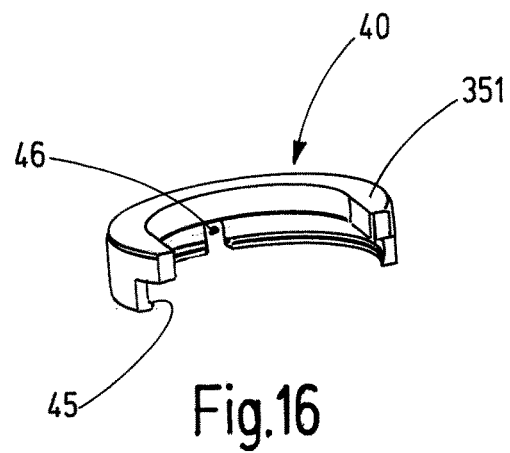
Fig.15  Fig.16

MACHINE TOOL HAVING A MOVABLE TOOL CARRIER, TOOL CARRIER AND TOOL HOLDER THEREFOR

RELATED APPLICATION(S)

This application claims the benefit of German Patent Application No. 10 2019 120 522.0, filed Jul. 30, 2019, and of European Patent Application No. 20175642.6, filed May 20, 2020. The contents of each of the foregoing applications are incorporated herein by reference as if fully rewritten herein.

TECHNICAL FIELD

The invention refers to a machine tool having a movable tool carrier that is configured to be equipped with tool holders and that has reception devices or receptacles for one tool holder in each case. Each tool holder and the tool carrier comprise support surfaces assigned to each other and devices for attaching the tool holder at the tool carrier. Positioning or adjustment means are provided configured to position the tool holder relative to its receptacle with high position accuracy.

BACKGROUND

For example, CNC-turning lathes or CNC-milling machines and machining centers frequently operate with a movable tool carrier in the form of a turret that is equipped with different tool holders that carry the tools required for the respective machining process. In doing so, it is known to fix the individual tool holders on the respective support surface of the associated support of the turret by means of multiple fixing screws. Examples for this are described in DE 199 40 330 A1 and DE 10 2008 048 206 A1. In automatically operated machine tools that operate with an automatic tool change, releasing and the retightening of the fixing screws of the tool holders is cumbersome. Simpler constructive conditions are achieved for an automatic tool holder change, if the tool holders work with a central clamping device in each case. One of the most known clamping systems with central clamping is subject of DIN ISO 10889. For machining processes that have to be carried out with high stress of the tools and, however, with high precision, the clamping force that can be achieved with these clamping systems is insufficient to retain the respective tool holder in a position that is sufficiently accurate on the support surface, e.g. of a star turret.

A tool clamping device that is equipped with a tool holder quick change system that complies with the highest requirements with regard to the positioning accuracy is known from DE 10 2014 119 482 A1. The devices for attaching the tool holders at the tool carrier comprise at least two tie rods that extend orthogonal to the support surface of the tool holder arranged with distance to each other and to at least one positioning or adjustment element. The tie rods are arranged separately at the tool holder or tool carrier. A clamping device provided at the tool carrier or the tool holder engages the tie rods during a clamping process and applies an axial clamping force thereon when the tool holder is inserted in the receptacle of the tool carrier. The clamping device comprises clamping elements in the form of clamping rods that are movably guided in the tool carrier or tool holder, that are coupled by the tie rods by means of wedge gears. The clamping elements are accessible from an outer side of the tool carrier and/or tool holder via actuating means.

Starting from the prior art, the object of the invention is to provide a machine tool, a tool carrier, particularly a turret, and a respectively assigned tool holder that are configured for an automatic tool change and that are characterized by a simple and very effective clamping function of the tool holder on the tool carrier while providing high positioning accuracy of the tool holder on the tool carrier.

SUMMARY

For solving this object, the machine tool, tool carrier, and tool holder include the features as described herein.

In the new machine tool with the features mentioned at the beginning the devices for attaching the tool holder on the tool carrier comprise at least one tie rod that is arranged in a manner extending orthogonal to the support surface of the tool holder or the tool carrier. A clamping device is assigned to the tool holder and/or the tool carrier configured to engage at the respective tie rod and to apply an axial clamping force thereon during a clamping process with the tool holder being inserted in the tool carrier. The axial clamping force presses the support surfaces of the tool holder and tool carrier against each other.

The clamping device comprises at least one clamping element that is supported to be adjustable between a clamping position and a release position and is arranged at the tool carrier transverse to the tie rod. The clamping element comprises a first clamping surface while a second clamping surface is provided at the tie rod. In the clamping position the first clamping surface of the clamping element engages the second clamping surface in a self-locking manner. The tie rod is elastically deformable in a limited manner in axial direction and is strained or lengthened by an amount that creates the required axial clamping force via the clamping surfaces that are in engagement with each other, if the clamping element takes the clamping position. The clamping element can be coupled with an actuating device assigned to the tool carrier by means of a coupling that can be controlled depending on the movement of the tool carrier. The clamping element can be adjusted between the clamping position and the release position by means of the controllable coupling.

Because the clamping surfaces provided at the clamping element and the assigned tie rod are in a self-locking engagement in the clamping position, each clamping element remains in its clamping position independent from the movement and the respective position of the tool carrier, e.g. the turret, without the need that continuous holding forces have to be applied on the clamping element by the actuating device or other holding devices for retaining the clamping element in the clamping position. If, for example, the tool of a tool holder is in a working position in a turret in which it acts on the workpiece, the tool holder change position at the periphery of the turret can be arbitrarily appropriately selected depending on the spatial requirements of the machine tool and its covering. The tie rod that is elastically deformable in a limited manner in axial direction allows to achieve high clamping forces in a wide range according to the respective requirements by simple constructive measures.

In a preferred embodiment the tie rod is formed as shank of the tool holder while the tool carrier comprises a reception bore extending orthogonal to its support surface. The reception bore is arranged in the area of the respective receptacle. In doing so, the tool holders of a common construction type can be used that comprise a central shank through which a tool drive shaft extends in case of a tool holder for driven tools.

The tool carrier does not require particularly elaborate additional constructive measures. The mounting of the longitudinal guides required for the reception of the clamping elements at the turret can be carried out easily.

BRIEF DESCRIPTION OF THE DRAWINGS

The drawings show embodiments of the subject matter of the invention:

FIG. 4 shows the turret of FIGS. 2 and 3 equipped with two tool holders in a perspective illustration with view onto the backside, FIG. 5 shows the arrangement of FIG. 4 in another perspective illustration, FIGS. 6-9 show a tool holder of the arrangement according to FIG. 4 with an assigned clamping element while illustrating different positions of the clamping element respective to the tool holder in perspective illustration in each case, FIG. 11 shows the turret according to FIG. 10 in a modified embodiment with an additional locking ring in a perspective illustration according to FIG. 4, FIG. 12 shows the arrangement according to FIG. 11 in another perspective illustration corresponding to FIG. 5, FIG. 13 shows a tool holder of the arrangement according to FIG. 4 in a modified embodiment and in perspective illustration, FIG. 14 shows the tool holder according to FIG. 13 with removed ring-shaped clamping part in a perspective illustration, FIG. 15 shows the ring-shaped clamping part of the tool holder according to FIG. 13 in a view from below and in perspective illustration, FIG. 16 shows the ring-shaped clamping part according to FIG. 15 in a view onto the top in perspective illustration.

DETAILED DESCRIPTION

Figure 1:
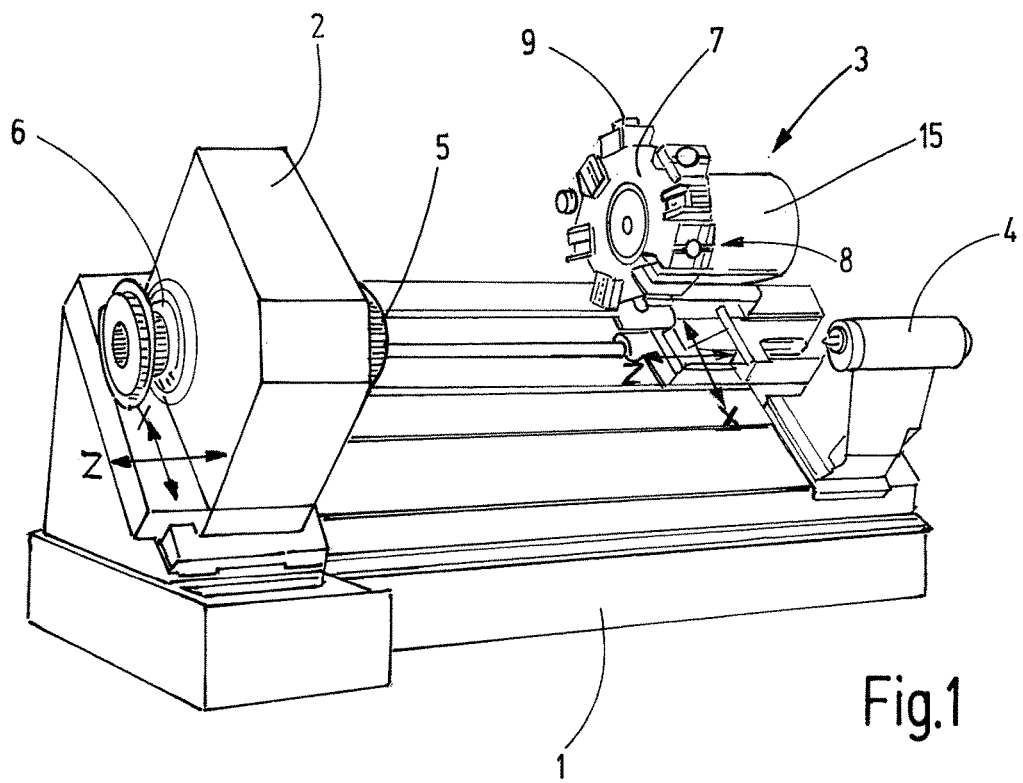
FIG. 1 shows a machine tool in form of a lathe according to the invention in a simplified schematic perspective illustration.

The turning lathe exemplarily schematically illustrated in FIG. 1 comprises a machine frame with a base 1 on which a spindle stock 2 and a turret 3 are respectively adjustably supported in X- and Z-direction. A spindle sleeve 4 that is also movable in Z-direction is assigned to spindle stock 2. The spindle sleeve 4 serves to support a not further illustrated workpiece that can be clamped in a chuck 5 on the spindle 6 supported on spindle stock 2. The tool turret 3 comprises a turret disc 7 that forms a tool carrier on the periphery on which receptacles 8 for tool holders 9 are provided that are configured for different machining applications, as schematically illustrated in FIG. 1.

Each of the receptacles 8 of the preferably polygonal turret disc 7 is configured with a planar support surface 10 (FIGS. 2, 3) through which a central cylindrical reception bore 11 extends for the shank of a tool holder 9. In addition, each support surface 10 is provided with reception grooves 12, 12a arranged cross-wise and provided for positioning or adjustment elements 13 (compare e.g. FIG. 6) provided at the assigned tool holder 9. The adjustment elements 13 are configured to ensure together with the reception grooves 12, 12a the exact and accurate position of an arranged tool holder 9.

By means of a flange 14 projecting from its backside the turret disc 7 is rotatably supported about its axis 16 in a housing 15 of the tool turret 3 comprising drive devices. As known the turret disc 7 can be rotated about the rotary axis 16 in a clocked manner by its drive device such that at least one of the tool holders 9 is placed in a machining position in which the tool provided therein can act on the workpiece.

One construction type of different tool holders 9 is exemplarily illustrated in FIGS. 6-10. The illustrated tool holder 9 comprises a housing 17 that is configured with a planar support surface 18 over which the adjustment elements 13 project axially. The adjustment elements 13 surround a cylindrical shank 19 arranged centrally and accommodated by the reception bore 11 of the respective receptacle 8 when the tool holder 9 is arranged on the turret disc 7. A drive shaft extending through the shank 19 is provided for a collet device 20 that is rotatably supported in the housing 17 and configured for reception of a driven tool. At its end extending beyond the shank 19 the tool drive shaft supports a coupling piece 21 for a tool drive device arranged in the area of the turret disc 7. The tool drive device is configured to drive the tool of the tool holder 9 taking the machining position for the machining process.

Figures 2, 3:
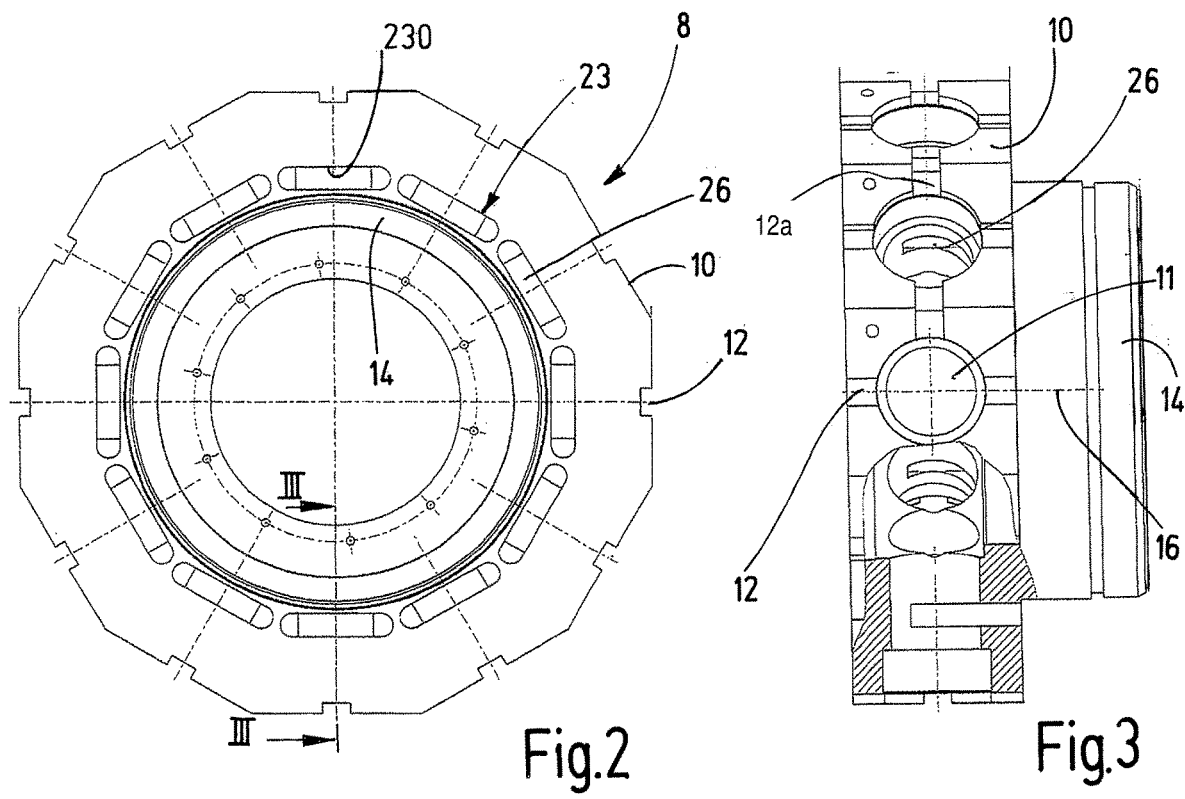
FIG. 2 shows the turret of the tool turret of the machine tool according to FIG. 1 in a plan view onto the backside.
FIG. 3 shows the turret of FIG. 2 in a side view that is partly cut along the line in FIG. 2.

For attaching the tool holder 9 at the turret disc 7 the shank 19 is configured as tie rod extending orthogonal to the support surface 18. The tie rod cooperates with a clamping device provided at the turret disc 7. This clamping device comprises a clamping element that is adjustably supported transverse to the shank 19 between a clamping position and a release position. The clamping element has preferably the form of a slider 22 that is shiftably guided in a longitudinal guide 23 of the respective receptacle 8 (FIG. 2).

In the cross-section slider 22 is rectangular and slider 22 is substantially plate-shaped with opposite surfaces 24, 25 that are arranged parallel to each other and that forming the wider sides of the slider 22. The lower surface 24 of these surfaces 24, 25 facing the rotary axis 16 of the turret disc 7 is referenced as first clamping surface. Each of the longitudinal guides 23 is provided with a slit-like opening 26 that is limited by parallel surfaces. The opening 26 extends from the backside of the turret disc 7 facing the support flange 14 into the reception bore 11 and is dimensioned such that it accommodates the respective slider 22 in a slidingly seated manner. The upper limiting wall 230 of the slit-like opening 26 is tightly toleranced in its position relative to the support surface 10 of the assigned receptacle 8. The slider 22 is provided with a half-circular shaped cutout 28 such that it has a substantially fork-like shape overall. It is connected with a first coupling element 29 arranged external from the turret disc 7 on its side opposite the cutout 28. The coupling element 29 has the form of a hook opening toward the circumference of the turret disc 7, as it is, for example, apparent from FIGS. 7 and 9. The thickness, i.e. the distance between the wider side surfaces 24, 25 of the slider 22, is also tightly toleranced such that the axial distance between the first clamping surface 24 and the support surface 10 corresponds to a defined dimension with tight tolerance.

A second coupling element 30 can be brought into engagement with the first coupling element 29. The second coupling element 30 is coupled with an actuating device 32 by means of an actuating rod 31, wherein the actuating device 32 is configured to adjust or move the slider 22 via the coupling elements 29, 30 in its longitudinal guide 23 between a clamping position and a release position fore and back. The actuating device 32 can comprise, for example, a hydraulic cylinder or another mechanical or electromechanical drive element that is selectively controllable externally and that allows to initiate the linear fore and back movement of the actuating rod 31, as mentioned. The hook shape of the complimentary coupling elements 29, 30 is configured such that the two coupling elements 29, 30—with reference to FIG. 10—can be shifted in an unimpeded manner transverse to the slider 22. For this reason they can be brought into engagement or out of engagement with each other by a rotary movement of the turret disc 7 about the rotary axis 16.

The shank 19 of the tool holder 9 is configured to be elastically strainable or stretchable within limits in axial direction. For this purpose in the illustrated embodiment the shank 19 is configured with a section of reduced diameter that forms a strain element 33. As an alternative the elastical strainability or stretchability of the shank 19 can also be achieved by other measures, e.g. by a respectively reduced wall thickness or purposeful cuts or comparable elements that result in the required strainability.

The strain element 33 is limited by a ring shoulder 34 on the side facing away from the tool holder 9. The ring shoulder 34 forms a second clamping surface 35 extending orthogonal to the axis of the shank 19. This second clamping surface 35 is positioned such that the first clamping surface 24 present on the lower side of the assigned slider 22 is arranged about a small predefined amount below the second clamping surface 35 of the shank with a tool holder 9 being arranged in the receptacle 8. In doing so, if the clamping surfaces 24, 35 are shifted on top of each other by means of the slider 22 that is relative to the turret disc 7 radially supported in the longitudinal guide 23, the shank 19 is strained or lengthened axially in the area of its strain element 33 by an amount such that the predefined clamping force is created required for a reliable pressing of the support surface 18 of the tool holder 9 on the support surface 10 of the turret disc 7. Thus, the strained shank 19 acts as a tie rod engaging centrally at the housing 17 of the tool holder 9.

At the outer edge of the first clamping surface 24 of the slider 22 and/or of the second clamping surface 35 of the shank 19 a running-on slant 330 or 340 is provided respectively that facilitates shifting of slider 22 on the second clamping surface 35 of the shank 19.

The substantially half-circular shaped cutout 28 at the slider 22 has a fork width that corresponds—apart from a radial play—to the diameter of the strain element 33 of the shank 19, such that with slider 22 being in clamping position, a full contact of its first clamping surface 24 on the second clamping surface 35 of the shank 19 is ensured. Therefore, the first clamping surface 24 usually extends radially beyond the central axis of the cylindrical strain element 33.

The function of the described clamping device is as follows:

Starting from a slider 22 being in a retracted release position according to FIG. 6, the shank 19 of the tool holder 9 has been inserted in the reception bore 11 of the assigned receptacle 8 of the turret disc 7 in correct orientation by an automatic tool holder change device or manually by an operator.

Subsequently, by respective control of the actuating device 32 shift of slider 22 against the shank 19 in forward direction it is initiated such that the first clamping surface 24 of the slider 22 is slid on the second clamping surface 35 of the shank 19 via the running-on slants 330, 340. Thereby shank 19 is pulled radially inward such that the necessary axial clamping force is created by the strain element 33 with which tool holder 9 is pressed on the turret disc 7. The situation during the running-on of the slider 22 on the second clamping surface 35 is illustrated in FIG. 7.

The slider 22 is shifted forward in the position illustrated in FIG. 8 after the running-on of its first clamping surface 24 on the second clamping surface 35 of the shank 19. In this position a reliable full engagement of the two clamping surfaces is ensured. In order to facilitate the forward sliding of slider 22 as described, the cutout 28 can comprise insertion slants 36 at its front end, as indicated in FIG. 8.

Because the two clamping surfaces 24, 35 are arranged in parallel planes, the slider 22 is retained in engagement with the shank 19 in a self-locking manner in its inserted clamping position according to FIG. 8. Therefore, there is no need for the actuating device 32 to apply a holding force on the assigned slider 22. The turret disc 7 can be rotated without influence of the actuating device 32 in any arbitrary angle position, because the coupling elements 29, 30 configured in hook shape do not impede the rotary movement of the turret disc 7 when the tool holders 9 are clamped.

In the illustrated embodiment the first and the second clamping surface 24 or 35 are orientated parallel to each other, as mentioned. Also other embodiments are considered in which these surfaces include a small angle with reference to each other in order to allow a readjustment of the sliders 22 relative to the respective shank 19, as it is e.g. appropriate for compensating of wear or manufacturing tolerances. For this the hook-shaped coupling elements 29, 30 have a sufficiently large play in their hook openings. However, the self-locking engagement of the clamping surfaces must be guaranteed in any case.

In the illustrated embodiment the sliders 22 are operated from the backside of the turret disc 7. In principle, embodiments are possible in which the sliders are accessible from the front side of the turret disc for operation. Also, it is not necessary that the second clamping surface 35 is formed by a ring shoulder of the shank 19. Other configurations are possible, e.g. in the shape of grooves, steps or the like. In any case, the shank 19 acts as tie rod that engages the tool holder centrally, whereby it is guaranteed that the tool holder is not deformed due to the effect of the clamping force and the actuation of the clamping elements and that the clamping force is effective orthogonal to the support surfaces 10, 18.

The new machine tool with the described tool carrier and tool holders is particularly configured for automatic tool change. For this a specific tool change position of the turret disc 7 is defined by the manufacturer of the machine. In this tool holder change position of the turret disc 7 the respective tool holder to be exchanged shall be well accessible in order to guarantee a tool holder change without difficulties while another tool holder being in the machining position carries out a machining process with its tool. The tool holder change position and the machining position are not directly linked. It has to be ensured that the clamping device of the tool holder to be exchanged can be operated by a machine operator or a respective handling system in an unimpeded manner.

For changing a tool holder 9 the turret disc 7 moves in its tool holder change position where the actuating device 32 is arranged. In doing so, the coupling elements 29, 30 of the slider 22 of the tool holder 9 to be removed get into engagement with each other. Now either by the control of the machine tool or by the machine operator the actuating device 32 is operated. It pulls the slider 22 out of the turret disc 7 via the actuating rod 31 and the coupling 29, 30 to an extent such that slider 22 reaches the release position according to FIG. 6. Thus, the tool holder 9 is unlocked. Now it can be removed from the turret disc 7 and can be replaced by another tool holder that is clamped in a manner already described with regard to FIGS. 6-10. For this the slider 22 is shifted forward such that it is inserted in the turret disc 7, whereby—with reference to FIG. 6—the tool holder 9 is pulled downward by the insertion slants 330, 340. The slider 22 presses on the clamping surface 35 at the shank 19 and deforms the strain element 33 of the shank of the tool holder, such that the tool holder 9 is clamped on the support surface 10 of the turret disc 7. Now another tool holder can be changed or the turret disc 7 moves the new tool holder given in exchange in the machining position and starts the machining process.

As already mentioned, the type of drive of the actuating device 32 has to be selected corresponding to the purpose. Only a mechanically effective connection to the slider 22 has to be present. This connection can be established directly by a rod arrangement, as illustrated. But the connection can also be established via one or more redirecting devices. Only the linear movement of the slider for clamping the tool holder must be achieved. Instead of the already mentioned hydraulic cylinder, also a threaded rod can be used, for example, in order to transfer a rotary movement of a motor in a linear movement.

Because the actuating device 32 is integrated in the machine tool, e.g. non-removably mounted, its control is preferably carried out by the machine tool itself. In doing so, it can be ensured that the tool holder change is not initiated at an inopportune point of time. The initiation of the tool holder change can be carried out by the machine operator or by the machine control, in that the machine operator enters a respective command to the control. The tool holder change can also be carried out automatically by a handling system of the machine, wherein the control of the handling system is coupled with the control of the machine tool in order to control the tool holder change.

The clamping force with which the tool holder 9 is clamped on the turret disc 7 is created by the elastic deformation of the shank 19. However, embodiments are basically possible in which multiple axially elastically deformable tie rods are assigned to one tool holder that basically cooperate in the manner described above with the assigned clamping elements and replace the shank 19 or are provided additionally to shank 19.

The shank 19 is accommodated in the reception bore 11 of the turret disc 7 with a certain radial play. In doing so, it is avoided that the exact positioning of the tool holder 9 on the respective support surface 10 of the turret disc 7 that is ensured due to the cooperation of the adjustment elements 13 with the reception grooves 12, could be affected by a shank urged in a tight reception bore. Particularly when having a small shank diameter it can be advantageous to provide a counter support for the slider on the side opposite the slider in the reception bore 11 in order to avoid that the shank is deflected to the side when the slider 22 is inserted. Such a counter support can be formed, e.g. by a separate counter bore element 350 as only schematically illustrated in FIG. 9, e.g. a threaded bolt slightly projecting in the reception bore 11 or a respective slight transverse offset of at least a portion of the inner wall of the reception bore 11.

As already explained, the sliders 22 are retained in their clamping position in a friction fit manner without the necessity of activating the actuating device 32 for this purpose. For example, during machining processes that create strong vibrations, e.g. during milling operations with interrupted cutting, it can be advantageous to provide additional locking measures that avoid an unintentional release of the sliders 22 taking the clamping position. Such locking means are exemplarily illustrated in FIGS. 11, 12:

The figures show the turret disc 7 in perspective views that correspond to the illustration of FIGS. 4 and 5. Similar parts are, therefore, referenced with the same reference numerals and are not explained again.

The locking means comprise a ring 37 having, for example, a rectangular cross-section that is immovably arranged on the backside of the turret disc 7 on the housing 15 of the tool turret 3 (FIG. 1). The ring 37 extends with low axial distance along the hook-shaped coupling elements 29 of the sliders taking the clamping position such that the sliders 22 are blocked to move outward—with reference to FIG. 12 to the right—i.e. away from the backside of the turret disc 7. At one location ring 37 comprises an interruption 38, the width of which is dimensioned such that it allows the passing of the coupling elements 29, 30 of the actuating device 32 arranged at this location, as apparent from FIG. 11. The ring 37 is thus positioned such that it does not impede the tool holder change at the arbitrarily selectable tool holder change position along the circumference of the turret disc 7.

Figure 9:
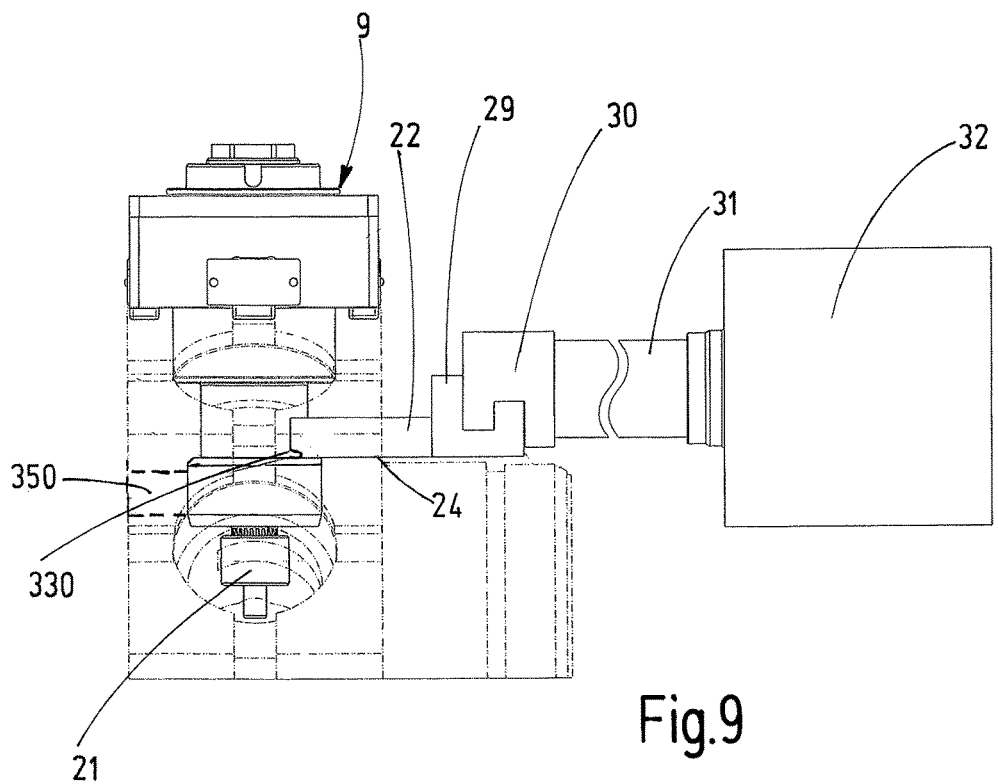
Figure 10:
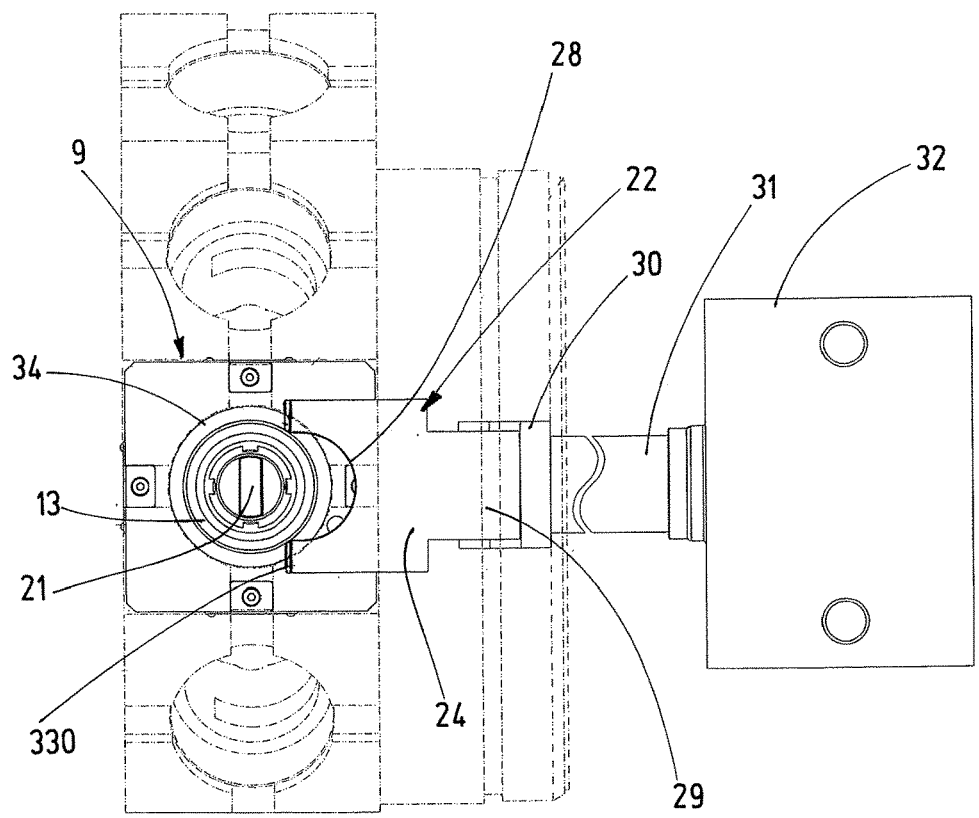
FIG. 10 shows the arrangement according to FIG. 9 in a plan view.

After termination of a tool holder change the respective slider is completely shifted into its clamping position according to FIG. 9, whereby the turret disc 7 can be freely clocked such that the tool of another tool holder reaches the machining position and a tool holder reaching the tool holder change position can be exchanged in a manner, as already explained.

The invention was exemplarily described with reference to a tool carrier in the form of a star turret 3. It is, however, also suitable for tool turrets designed differently and can also be used for tool carriers that carry out a linear movement in order to bring their tools in the respective machining position or tool holder change position.

As explained based on the disclosed embodiments of the turret disc 7 and the tool holder 9, during a clamping action of a tool holder 9 the assigned slider 22 slides with its first clamping surface 24 over the second clamping surface 35 at the tie rod formed by the shank 19 of the tool holder 9. Thereby the slider 22 is supported via its wider side surface 25—provided opposite its clamping surface 24—on the upper limiting wall 230 of the slit-like opening 26 of the longitudinal guide 23, such that the slider 22 is able to transmit the relatively large clamping force on the shank 19 acting as tie rod that is necessary for clamping the tool holder 9 in the correct position. This means that the clamping surfaces 24, 35 and 25, 230 cooperating with each other are designed in a manner and made from such cooperating materials that the function is not effected by wear on these surfaces also during longer periods of operation of the machine tool. Therefore, the surfaces 24, 25, 35 and 230 can be individually or in pairs, for example, provided with a suitable coating preferably made of hard materials (e.g. TiC, TiN, etc.). It is also possible to provide inserts at the slider 22 or the slit-like opening 26 of the longitudinal guide 23 accommodating the slider 22, wherein the inserts are made of a wear-resistant material or are coated with such a material and wherein the inserts provide the surfaces 24, 25, 230 and 35.

Figure 17:
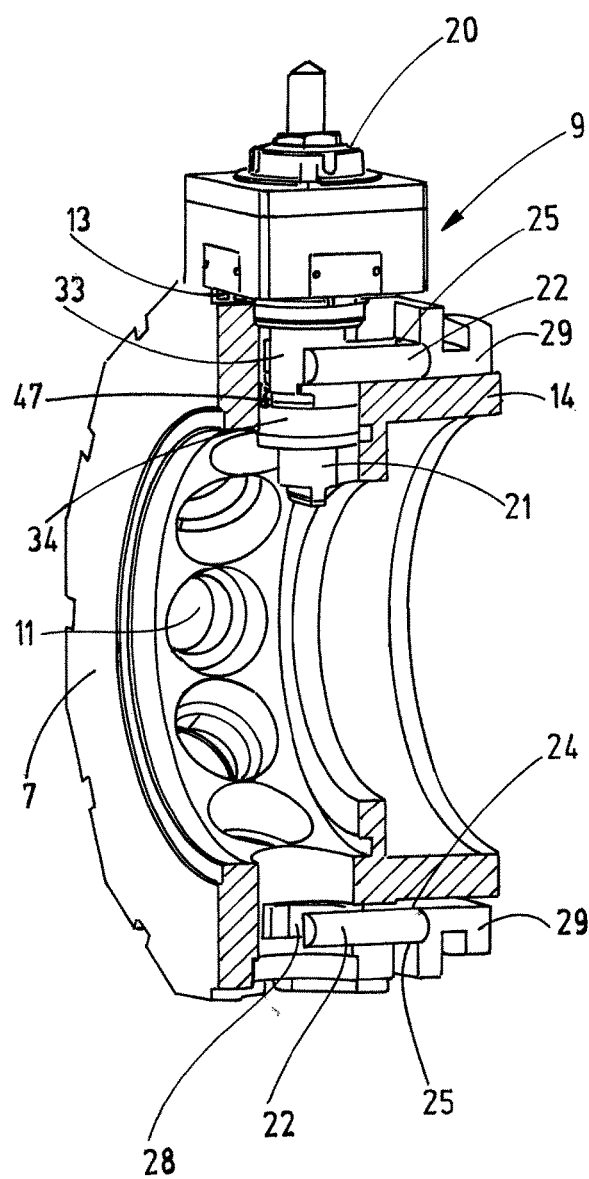
FIG. 17 shows the turret according to FIG. 4 or 5 equipped with a tool holder according to FIG. 13 axially cut and partly perspectively illustrated and FIG. 18 the arrangement according to FIG. 17 partly illustrated in another perspective.
Figure 18:
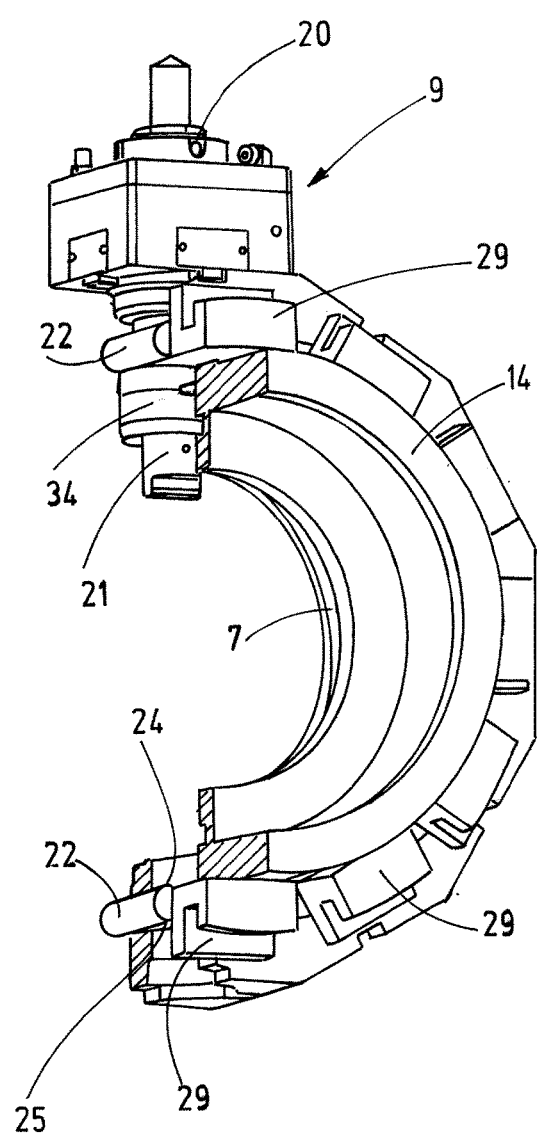

In FIGS. 13, 14 an embodiment of a tool holder is illustrated in which these considerations of the wear resistance of the function surfaces of the slider 22 and the tool holder 9 being in engagement with each other are considered by particular measures:

The tool holder 9 corresponds in its basic configuration to the tool holder 9 explained with reference to FIGS. 6-10, while the turret disc 7 with the assigned clamping devices for the tool holders 9 illustrated in FIGS. 17, 18 corresponds to the embodiments according to FIGS. 4 and 5. The same parts are therefore characterized by the same reference numerals and are not explained again.

While the second clamping surface 35 is directly formed at the ring shoulder 34 of the shank 19 in the embodiment of tool holder 9 according to FIGS. 6-10, the second clamping surface having the reference numeral 351 in this embodiment according to FIGS. 13, 14 is formed at a separate ring-shaped clamping part 40. The details are particularly apparent from FIGS. 15, 16. The clamping part 40 consists of a wear-resistant material, e.g. hard material. It can also carry a wear-resistant coating on its clamping surface 351 leading to an advantageous surface cooperation, as already mentioned above. The clamping part 40 is configured as ring segment, i.e. it has a substantially horseshoe-shaped form, the inner diameter of which corresponds in the area of the clamping surface 351 to the diameter of the cylindrical strain element 33 such that it can be slid on the strain element 33 from the side. In the condition in which the clamping part 40 is slid on the strain element 33 the clamping part 40 takes the position shown in FIG. 13 in which it is in full contact with its lower support surface 41—opposite the accurately finished second clamping surface 351—with a clamping surface 35 of the ring shoulder 34 of the shank 19. The support surface 41 is accurately finished. Its axial distance from the parallel clamping surface 351 is defined exactly such that, in the mounted condition, the second clamping surface 351 can cooperate in the already described manner with the clamping surface 24 at the slider 22.

In order to hold the ring-shaped clamping part 40 on the shank 19 in a rotation-locked manner, a ring flange 43 is formed on the ring shoulder 34 on the shank 19. The ring flange 43 is provided with a ring groove 44 at its circumference that can be engaged by a ring-shaped shoulder 45 of the clamping part 40, such that the clamping part 40 is retained axially immovably on the shank in its slid on mounted condition. In addition, at least one flattening 444 is provided at the peripheral surface of the ring flange 43 to which corresponding flattening on the inner side of the clamping part 40 is assigned providing a rotation lock of the clamping part 40 slid on the shank 19. For example, on the diametrically opposite side of the shank a second corresponding flattening can be assigned to the flattening 440, as it is also possible to provide multiple of such flattenings 440 distributed around the circumference of the ring flange 43 in order to be able to clamp the tool holder 9 selectively in multiple rotary positions of a shank on the turret disc 7.

In areas of the flattening 440 a radial threaded bore 45 is provided. At the clamping part 40 an opening 46 that is open to the edge is provided. In the mounted condition the threaded bore 45 is flush with the opening 46. A locking screw 47 illustrated in FIG. 17 can be screwed in the threaded bore 45 that is configured to retain the clamping part 40 on the shank 19 undetachably.

Prior to the insertion of tool holder 9 in the turret disc 7 starting from the condition shown in FIG. 14, the horseshoe-shaped clamping part 40 can be slid on the ring flange 43 (with reference to FIG. 14 pivoted about 90° to the right) and fixed in this condition according to FIG. 13 by means of the locking screw 47.

The ring-shaped or horseshoe-shaped clamping part 40 can be simply replaced, if it is necessary or advantageous due to wear. In addition, the clamping force occurring during the clamping process can be adapted to the respective requirements or a manufacturing tolerance can be compensated with clamping parts of different axial thickness by adjusting the distance between the surfaces 41, 351 accordingly. As it is for example apparent from FIGS. 17, 18, the closed circumferential area of the ring-shaped clamping part 40 is positioned opposite slider 22 such that it cannot be pushed away from shank 19 by the slider 22 during the clamping process.

The clamping part 40 can have a multi-part configuration. Embodiments of the tool holder are possible in which the ring flange 43 is omitted or replaced, e.g. by grooves or the like at the shank 19.

The invention claimed is:

1. A machine tool comprising:
   a movable tool carrier (7) configured to be equipped with tool holders and comprising receptacles (8) for the tool holders (9), wherein each tool holder (9) and tool carrier (7) comprise support surfaces (10, 18) assigned to each other and devices for mounting the tool holder (9) at the tool carrier (7),
   wherein the devices for mounting of the tool holder (9) comprise at least one tie rod (19) extending orthogonal to the support surface of the tool holder or tool carrier and wherein a clamping device is assigned to the tool holder and/or the tool carrier that is configured to engage the respective tie rod and to apply an axial clamping force thereto during a clamping process when the tool holder is inserted in one of the receptacles, the clamping force pressing the support surfaces of the tool holder and the tool carrier onto each other,
   wherein the clamping device comprises a clamping element (22) that is adjustably supported transverse to the tie rod between a clamping position and a release position and that provides a first clamping surface (24),
   a second clamping surface (35) of the tie rod with which the first clamping surface (24) of the clamping element (22) is in self-locking engagement in the clamping position,
   wherein the tie rod is configured to be elastically strained in an axial direction and is strained by means of the first and second clamping surfaces (24, 35) being in engagement with each other in the clamping position of the clamping element (22) to an extent that creates the axial clamping force,
   wherein the clamping element (22) is configured to be coupled with an actuating device (32) assigned to the tool carrier (7) by a coupling (29, 30) controllable depending on movement of the tool carrier (7), wherein the clamping element (22) is adjustable between the clamping position and the release position by the actuating device (32),
   wherein the tool carrier (7) is movable in a machining position for one tool holder arranged on one of its receptacles and in a tool holder change position and the actuating device (32) configured to actuate the clamping element (22) is arranged in the area of the tool holder change position, wherein the actuating device

(32) is coupled with the clamping element (22) via a releasable coupling (29, 30), and wherein the releasable coupling comprises a first coupling element (29) connected with the clamping element (22), wherein the first coupling element (29) is configured to automatically couple or decouple with a complimentary second coupling element (30) of the actuating device (32) depending on the movement of the tool carrier (7).

2. The machine tool according to claim 1, wherein the tie rod is configured as a shank (19) of the tool holder (9) and that the tool carrier (7) comprises a reception bore (11) extending orthogonal to its support surface (10) in the area of its respective receptacle (8).

3. The machine tool according to claim 1, wherein the tie rod comprises a strain element (33).

4. The machine tool according to claim 1, wherein the clamping element comprises a slider (22) and the tool carrier (7) is provided with a longitudinal guide (23) in the area of its respective receptacle (8), wherein the longitudinal guide (23) is configured to accommodate the slider (22).

5. The machine tool according to claim 4, wherein the slider (22) includes a fork-shaped end with a fork width that partly encircles the assigned tie rod and the first clamping surface (24) is arranged in the area of the fork-shaped end.

6. The machine tool according to claim 1, wherein the first and the second clamping surfaces (24, 35) are arranged parallel to each other, wherein at least one of the first and second clamping surfaces (24, 35) is provided with a running-on slant (330, 340).

7. The machine tool according to claim 1, wherein the first and the second clamping surfaces (24, 35) are wedge surfaces that cooperate in a self-locking manner.

8. The machine tool according to claim 1, wherein at least one of the first and second coupling elements (29, 30) has a hook-like configuration.

9. The machine tool according to claim 1, wherein locking means for the clamping elements (22) are assigned to the tool carrier (7) by which at least the clamping element (22) for the tool holder (9) being in the machining position can be locked in a form-fit and position maintaining manner.

10. The machine tool according to claim 9, wherein the locking means comprise at least one locking element (37) for locking the clamping elements (22) that extends along a series of the receptacles (8) of the tool carrier (7) and is ineffective in the area of the tool holder to change position of the tool holder (9).

11. The machine tool according to claim 10, wherein the at least one locking element comprises an immovably supported ring (37) that comprises an interruption (38) at least in the area of the tool holder change position.

* * * * *